US009676533B2

(12) United States Patent
Mottram et al.

(10) Patent No.: US 9,676,533 B2
(45) Date of Patent: Jun. 13, 2017

(54) TAMPER-EVIDENT PACKAGE AND METHOD FOR MAKING SAME

(71) Applicant: Adcraft Products Co. Inc., Anaheim, CA (US)

(72) Inventors: Keith Mottram, Orange, CA (US); Kenneth Collins, Dana Point, CA (US)

(73) Assignee: ADCRAFT PRODUCTS CO. INC., Anaheim, CA (US)

( * ) Notice: Subject to any disclaimer, the term of this patent is extended or adjusted under 35 U.S.C. 154(b) by 0 days.

(21) Appl. No.: 15/008,361

(22) Filed: Jan. 27, 2016

(65) Prior Publication Data
US 2016/0280442 A1 Sep. 29, 2016

Related U.S. Application Data

(63) Continuation-in-part of application No. PCT/US2015/046808, filed on Aug. 25, 2015.
(Continued)

(51) Int. Cl.
*B65D 85/00* (2006.01)
*B65B 61/20* (2006.01)
(Continued)

(52) U.S. Cl.
CPC ........... *B65D 65/40* (2013.01); *B65D 75/322* (2013.01); *B65D 75/323* (2013.01); *B65B 61/20* (2013.01); *B65D 2101/00* (2013.01)

(58) Field of Classification Search
CPC .... B65D 65/40; B65D 75/322; B65D 75/323; B65D 75/325; B65D 2101/00; B65B 61/20
(Continued)

(56) References Cited

U.S. PATENT DOCUMENTS 3,857,485 A * 12/1974 Frank ................... B65D 81/30
206/216
4,878,579 A * 11/1989 Hager ................... A47G 1/12
206/0.83
(Continued)

OTHER PUBLICATIONS

International Search Report from ISA/KR dated Jul. 12, 2016 for International Application No. PCT/US2016/023954.
(Continued)

*Primary Examiner* — Luan K Bui
(74) *Attorney, Agent, or Firm* — Klein, O'Neill & Singh, LLP

(57) ABSTRACT

A tamper-evident package includes a flexible web having first and second opposed surfaces, and a tamper-evident layer on at least the first surface. The tamper-evident layer defines a blank space on the web, and includes a first pattern of protected areas and a second pattern of tamper-evident areas. A first semi-rigid outer layer is attached to the first tamper-evident layer so as to adhere only to the tamper-evident areas on the tamper-evident layer, the first semi-rigid outer layer including a transparent portion aligned with the blank space. A second semi-rigid outer layer is attached to the second surface of the web. The blank space may be removed to form a hole in the web, and the second outer layer may include a transparent portion aligned with the hole. A second tamper-evident layer may optionally be provided on the second surface of the web.

23 Claims, 13 Drawing Sheets

Related U.S. Application Data

(60) Provisional application No. 62/139,551, filed on Mar. 27, 2015.

(51) Int. Cl.
 *B65D 65/40* (2006.01)
 *B65D 75/32* (2006.01)

(58) Field of Classification Search
 USPC ...... 206/0.8, 0.81, 39, 459.1, 462, 463, 530, 206/579, 807; 53/411, 452, 467, 473, 53/507
 See application file for complete search history.

(56) References Cited

U.S. PATENT DOCUMENTS

| | | | |
|---|---|---|---|
| 4,972,953 A | | 11/1990 | Friedman et al. |
| 6,096,387 A | | 8/2000 | Decker |
| 8,342,414 B2 * | | 1/2013 | Chapman ............... B42D 25/00 235/487 |
| 2001/0006713 A1 | | 7/2001 | Otten et al. |
| 2006/0234014 A1 | | 10/2006 | Liu et al. |
| 2007/0080090 A1 | | 4/2007 | Gherdan et al. |
| 2008/0020165 A1 | | 1/2008 | Drori |
| 2008/0023351 A1 * | | 1/2008 | Macor ................... B65D 85/58 206/232 |
| 2008/0029419 A1 * | | 2/2008 | Appelbaum ....... B65D 73/0057 206/463 |
| 2008/0230402 A1 * | | 9/2008 | Macor ................. G06Q 30/018 206/0.81 |
| 2009/0038977 A1 | | 2/2009 | Tilton |
| 2010/0084289 A1 | | 4/2010 | Willms et al. |
| 2011/0049003 A1 | | 3/2011 | Bellamah et al. |
| 2011/0079529 A1 * | | 4/2011 | Appelbaum ....... B65D 73/0057 206/462 |
| 2011/0089052 A1 * | | 4/2011 | Haire .................... B65D 85/58 206/0.81 |
| 2012/0067746 A1 * | | 3/2012 | Gremaud ................. A45C 1/10 206/0.81 |
| 2013/0248406 A1 * | | 9/2013 | Glinert ................... B65B 11/52 206/497 |

OTHER PUBLICATIONS

Written Opinion from ISA/KR dated Jul. 12, 2016 for International Application No. PCT/US2016/023954.
International Search Report from ISA/USPTO dated Jan. 13, 2016 for International Application No. PCT/US2015/046808.
Written Opinion from ISA/USPTO dated Jan. 13, 2016 for International Application No. PCT/US2015/046808.

* cited by examiner

TAMPER-EVIDENT PACKAGE AND METHOD FOR MAKING SAME

CROSS-REFERENCE TO RELATED APPLICATION

This application is a Continuation-in-Part of International Application No. PCT/US2015/046808, filed Aug. 25, 2015, which claims priority, under 35 U.S.C. §119(e), from U.S. Provisional Application No. 62/139,551, filed Mar. 27, 2015. The disclosures of the foregoing applications are incorporated herein by reference in their entireties.

FEDERALLY SPONSORED RESEARCH OR DEVELOPMENT

Not Applicable.

BACKGROUND

This disclosure relates broadly to the field of packaging. More specifically, it relates to secure packages, especially tamper-evident packages, for collectible coins, small precious metal bullion items (such as coins, medallions, and ingots), precious stones, and the like, as well as tamper-evident packaging for other relatively small items requiring a measure of security. The term "tamper-evident," as used herein, means that the package will be permanently and visibly altered if an attempt is made to open it and/or access its contents after the packaged article is sealed within it, thereby providing easily-discerned evidence that such an attempt has been made. In this way, undetected removal of the item from its package is made extremely difficult, if not impossible.

Tamper-evident packages are now in widespread use for collectible coins and precious metal items, due to the demand by consumers for some form of authentication that the item they wish to purchase is genuine and legitimate, and not a counterfeit or some other item of lesser value. Typically, current tamper-evident packages are in the form of hard plastic cases that are difficult to open without being so damaged as to be irreparable without visible signs of having once been opened. Such "hard-shell" cases are bulky and expensive. Moreover, ways are being found to defeat their tamper-evident features. Therefore, purchasers frequently rely on so-called "certificates of authenticity." Such certificates, however, can be forged or otherwise faked, or they can be lost, requiring the purchaser to have the item authenticated by a specialist, entailing additional cost and inconvenience.

Consequently, there has been a need for a tamper-evident package for the above-described items and the like that is less costly to manufacture, more reliably tamper-evident, and less bulky to transport and store than is the hard shell case in common use. There is a further need for a tamper-evident package that is reliably self-authenticating, obviating (or at least reducing) the need for a separate certificate of authenticity.

SUMMARY

Broadly, in one aspect, this disclosure relates, in some embodiments, to a method of packaging an item, comprising the steps of: (a) forming a tamper-evident layer on a first surface of a web of sheet material having first and second surfaces, the tamper evident layer comprising a pattern of tamper-evident areas, the tamper-evident layer defining a blank space; (b) adhesively attaching a first semi-rigid outer layer having a portion defining a cavity to the tamper-evident layer so as to adhere only to the tamper-evident areas, whereby the cavity is aligned with the blank space; (c) placing an item in the cavity defined in the first outer layer; and (d) adhesively attaching a second semi-rigid outer layer to the second surface of the web. In accordance with this aspect, the step of adhesively attaching the first semi-rigid outer layer to the tamper-evident areas is performed so that only the tamper-evident areas are removed from the web with the removal of the first outer layer from the tamper-evident layer.

Other embodiments in accordance with this aspect include the step of forming a second tamper-evident layer on the second surface of the web of sheet material, the second tamper-evident layer comprising a pattern of second tamper-evident areas. In such embodiments, adhesively attaching a second semi-rigid outer layer includes adhesively attaching the second semi-rigid outer layer to the second tamper-evident layer so as to adhere only to the second tamper-evident areas. In accordance with these embodiments, the steps of adhesively attaching the first semi-rigid outer layer to the first tamper-evident areas and adhesively attaching the second outer layer to the second tamper-evident areas are performed so that only the first and second tamper-evident areas are removed from the web with the removal of the first and second outer layers from the first and second tamper-evident layers, respectively.

In accordance with a second aspect, the disclosure relates to a tamper-evident package, comprising a laminate comprising: a flexible web having first and second opposed surfaces; a tamper-evident layer on the first surface, wherein the tamper-evident layer defines a blank space and includes a first pattern of tamper-evident areas and a second pattern of protected areas; a first semi-rigid outer layer adhesively attached to the tamper-evident layer so as to adhere only to the tamper-evident areas on the tamper-evident layer, the first semi-rigid outer layer including a transparent portion aligned with the blank space; and a second semi-rigid outer layer adhesively attached to the second surface of the web. In some embodiments, the tamper-evident layer on the first web surface is a first tamper-evident layer, and the tamper-evident package includes a second tamper-evident layer on the second surface of the web, the second tamper-evident layer including a first pattern of tamper-evident areas and a second pattern of protected areas, wherein the second semi-rigid outer layer is adhesively attached to the second tamper-evident layer so as to adhere only to the tamper-evident areas on the second tamper-evident layer.

In accordance with a third aspect, the disclosure relates to a packaged item, comprising a flexible web having first and second opposed surfaces; a tamper evident layer on the first surface of the web, the tamper evident layer having a first pattern of tamper-evident areas and a second pattern of protected areas, the first and second patterns defining a blank space on the first surface of the web; a first semi-rigid outer layer adhesively attached to the first tamper-evident layer so as to adhere only to the tamper-evident areas on the first tamper-evident layer, the first semi-rigid outer layer including a transparent portion aligned with the blank space; an item disposed on the blank space of the web so as to be visible through the transparent portion of the first semi-rigid outer layer; and a second semi-rigid outer layer adhesively attached to the second surface of the web. In some embodiments, the tamper evident layer is a first tamper-evident layer, these embodiments further comprising a second tamper-evident layer on the second surface of the web, the second tamper-evident layer including a first pattern of tamper-evident areas and a second pattern of protected areas, wherein the second semi-rigid outer layer is adhesively attached to the second tamper-evident layer so as to adhere only to the tamper-evident areas on the second tamper-evident layer.

DETAILED DESCRIPTION

Figure 1:
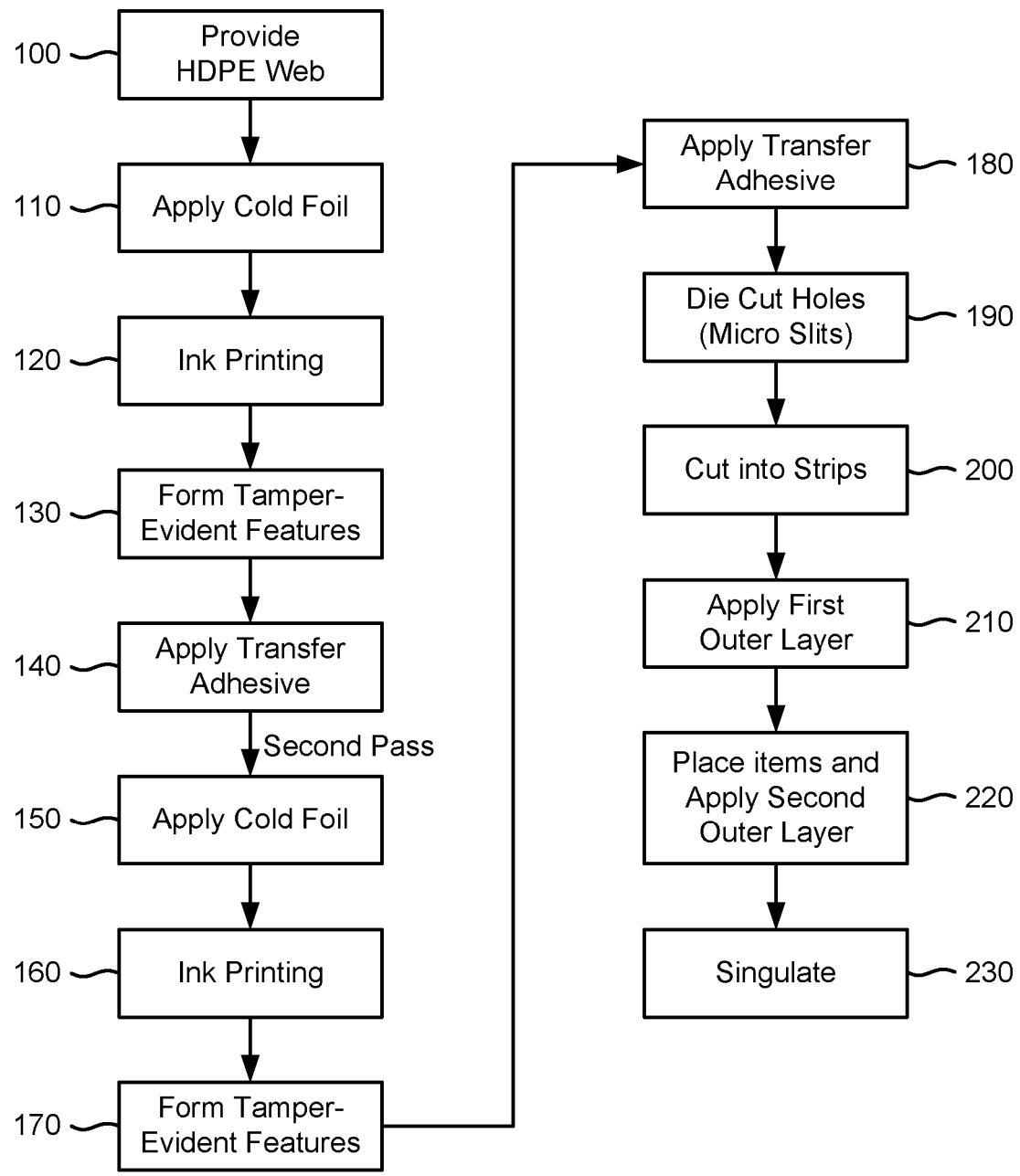
FIG. 1 is a flow chart of an exemplary method for manufacturing a tamper-evident package in accordance with embodiments of the present disclosure.

The aspects of this disclosure relating to embodiments of a tamper-evident package are best understood by describing exemplary embodiments of the method of manufacturing the package. The steps in the method are best understood with reference to the flow charts shown in FIGS. 1 and 1A, and the drawings in FIGS. 2-12.

The disclosed tamper-evident package is made as a laminate of several lamination components or layers. A first exemplary manufacturing method is illustrated in the flow chart of FIG. 1. The manufacturing process starts in step 100 with the provision of a first lamination component in the form of a continuous web 10 (FIG. 2), which may be dispensed from a first roll (not shown), and taken up on a second roll (not shown) after each pass through the processing apparatus. A suitable material for the web 10 is a topcoated HDPE, for example, the HDPE extruded film marketed under the trademark SYNTHERM® by Acucote, Inc., of Graham, N.C., or an equivalent. The web has a first surface and an opposite second surface. In some embodiments, the web may optionally be printed with registration marks on the second surface in an initial "pass" through the steps of the process.

Step 110 (FIG. 1) begins the process of applying a tamper-evident layer to the first surface of the web 10. In step 110, a first plurality of cold foil strips 12a (FIG. 3) is applied to the first surface of the web 10. This is done by first printing a primer onto the first surface of the web 10 in areas defined by a printing plate (not shown), and then by printing a UV-curable adhesive onto the primed areas. A layer of "cold foil" (e.g., a metallized polyester) is then transferred to the first surface of the web 10, using a PET liner (not shown), as is well-known in the art. After the adhesive is cured and the PET liner is peeled off, the cold foil adheres only to the areas printed with the primer and the adhesive, leaving the first plurality of cold foil strips 12a in the arrangement and configuration shown in FIG. 3: a first plurality of spaced-apart parallel strips 12a, each with a row of blank spaces 14, designating what will become the package windows for the items to be contained therein. As shown, the blank spaces 14 are round, but this shape is exemplary only. In practice, the blank spaces 14 may be made in any suitable shape and size to accommodate items that may be circular, oblong, rectangular, square, elliptical, or any other configuration. The number of blank spaces 14 may be varied, depending on the size and shape of the items to be packaged. In some embodiments, the cold foil strips 12a may be pigmented with a colorant, such as an ink.

Optionally, a contrasting (e.g., white) ink may be printed on the web 10 to provide other visual features. For example, a contrasting "frame" 20 (FIG. 5) may be printed around each of the blank spaces 14 (step 120, FIG. 1). Each frame 20 may include a "tag" portion 22. The frames 20 with the tag portions 22 may provide areas for printing or applying descriptive information or bar codes to assist in describing the packaged item to the consumer and/or to provide security or tracking information. Optionally, the ink forming the frames 20 and tags 22 (or other printed features) may include an encoded taggant, such as an encoded DNA taggant, for security purposes. The primer and the UV-curable adhesive, as described above, would be applied in a pattern whereby the cold foil would not adhere to the ink-printed areas, such as the areas corresponding to the frames 20 and tags 22. The result would be the foil arrangement shown in FIG. 5, wherein each of the cold foil strips 12 is shown as providing a tamper-evident layer.

Step 130 (FIG. 1) relates to the formation of a tamper-evident feature for the packages. The tamper evident feature is provided by the application of a release agent and an adhesive deadener in a pre-defined pattern on the exposed surface of the first plurality of cold foil strips 12a. This is done by first printing a UV-curable release agent in a predefined pattern onto the cold foil strips 12a, and then over-printing a UV-curable adhesive deadener on top of the release agent. The result is a repetitive pattern of "protected" areas 16 (FIG. 4), each formed of a layer of adhesive deadener on top of a layer of release agent, as further described below. The release agent, in some embodiments, may include an encoded taggant for security purposes. Such encoded taggants are well-known, and may include micro-taggants or nano-taggants that are encoded to provide a security "signature" in response to IR or RF scanning. Alternatively, the taggant may include encoded DNA markers. (Alternatively, a security taggant may be provided in other portions or areas of the tamper-evident layer.) The pattern of protected areas 16 defines a complementary pattern of "unprotected" areas that serve as tamper-evident areas 17, as will be described below.

Next, in step 140, a transfer adhesive (preferably a transparent, pressure-sensitive adhesive) is applied onto the first plurality of cold foil strips 12a. The adhesive is provided, for example, as an acrylic emulsion sandwiched between top and bottom liners of a clear plastic (such as PET) coated with a release agent. The bottom liner is stripped off, and the exposed adhesive is pressure-rolled onto the exposed surfaces of the first plurality of cold foil strips 12a, leaving the top liner covering the first surface of the web 10, including the cold foil strips 12a and the blank spaces 14. The transfer adhesive covers the protected areas 16 that have been formed of the release agent and the adhesive deadener, and it fills the "empty" areas of the cold foil strips 12a to which the release agent and adhesive have not been applied, as will be further explained below. At this point, each of the first plurality of cold foil strips 12a provides a tamper-evident layer on a first surface of the web 10.

The web 10 is now ready for a second "pass" through the process. If the web 10 has been taken up on a second roll, the web may be rewound back onto the first roll, or otherwise positioned to expose its opposite (second) surface for processing in the second pass. During the second pass, a second plurality of cold foil strips 12b (FIG. 5) is applied to the second surface of the web 10 (step 150). Optionally, the second plurality of cold foil strips 12b may be ink-printed (step 160) to provide additional visual features. For example, the frames 20 and tab portions 22 may be printed on the second surface instead of the first surface, as described above. Other features may optionally be printed on the second surface. In an optional step 170, the second plurality of cold foil strips 12b may be provided as a second tamper-evident layer by forming the tamper evident features on them, in the manner described above with reference to the step 130. The transfer adhesive is then applied to the second plurality of cold foil strips 12b (step 180), as described above with reference to step 140.

At this point, a laminated structure has been formed, comprising the web 10 with first and second opposed surfaces, to which have respectively been applied the first and second plurality of cold foil strips 12a, 12b. As discussed above, at least the first plurality of cold foil strips 12a have the pattern of protected areas 16 (defining a complementary pattern of tamper-evident areas 17), with a similar pattern of protected areas 16 and tamper-evident areas 17 being optionally provided by each of the cold foil strips 12b in the second plurality. The transfer adhesive on the first plurality of cold foil strips 12a and the second plurality of cold foil strips 12b is covered by a clear plastic liner.

Figure 6:
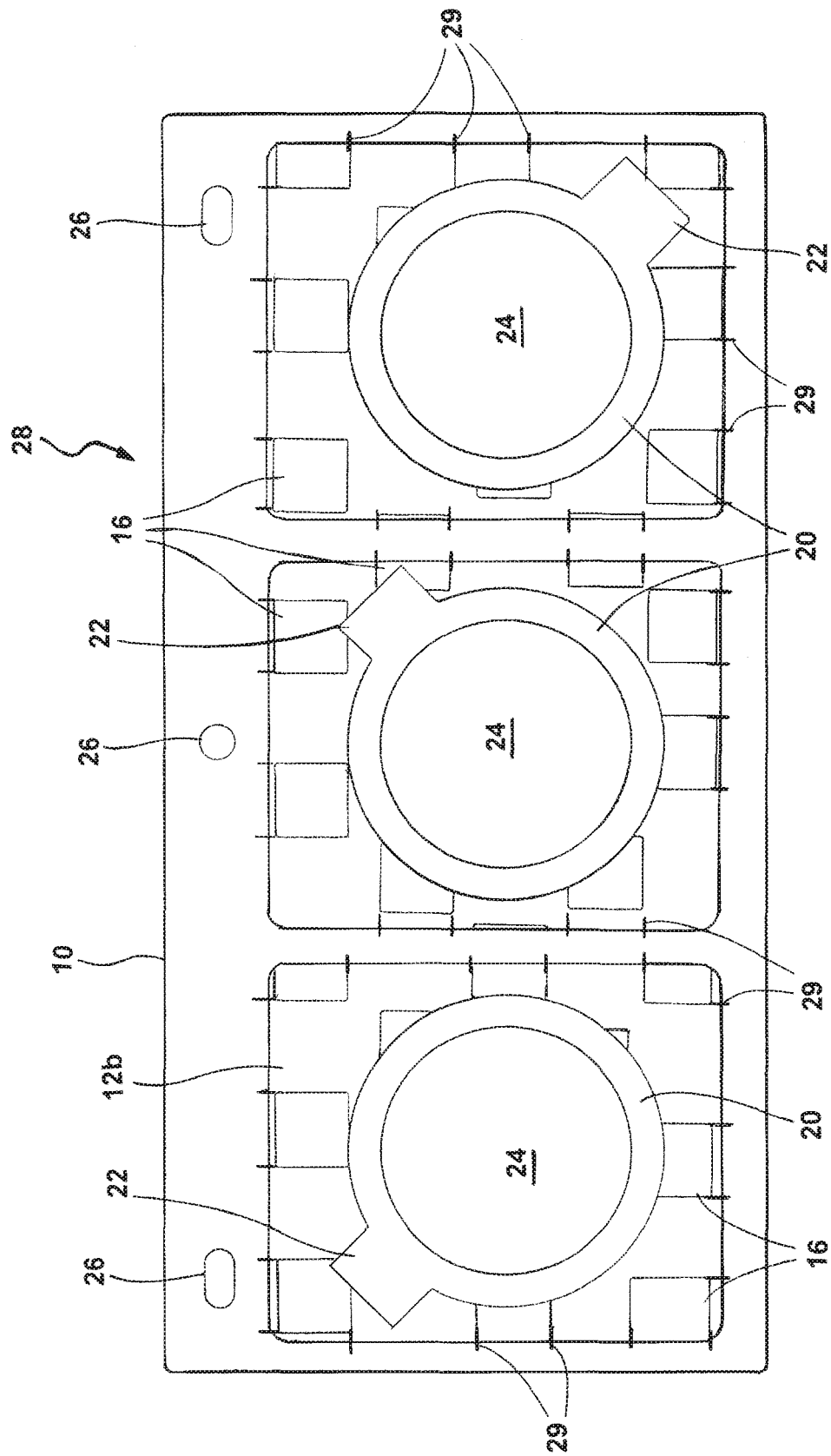
FIG. 6 is a plan view of a strip of packages cut from the web of FIG. 5, after the application of a sheet of clear plastic blister material thereto.

The next step shown in FIG. 1 (i.e., step 190), includes die-cutting the web to form a hole 24 corresponding to each of the blank spaces 14, as well as a plurality of registration apertures 26 (the purpose of which will be explained below), resulting in the arrangement shown in FIG. 6. The die-cutting may cut all the way through the laminate, or it may leave one of the clear plastic liners 18 intact when all die-cut areas are removed, as shown in FIG. 6. If the second plurality of cold foil strips 12b has been made without the blank spaces 14, the second plurality of cold foil strips 12b should not be cut through in this step, nor, preferably, should the web 10. As also shown in FIG. 6, at this point the laminated structure is advantageously cut into strips 28 (step 200), each of which includes a row of holes 24 and a row of registration apertures 26 adjacent one edge.

Figure 14:
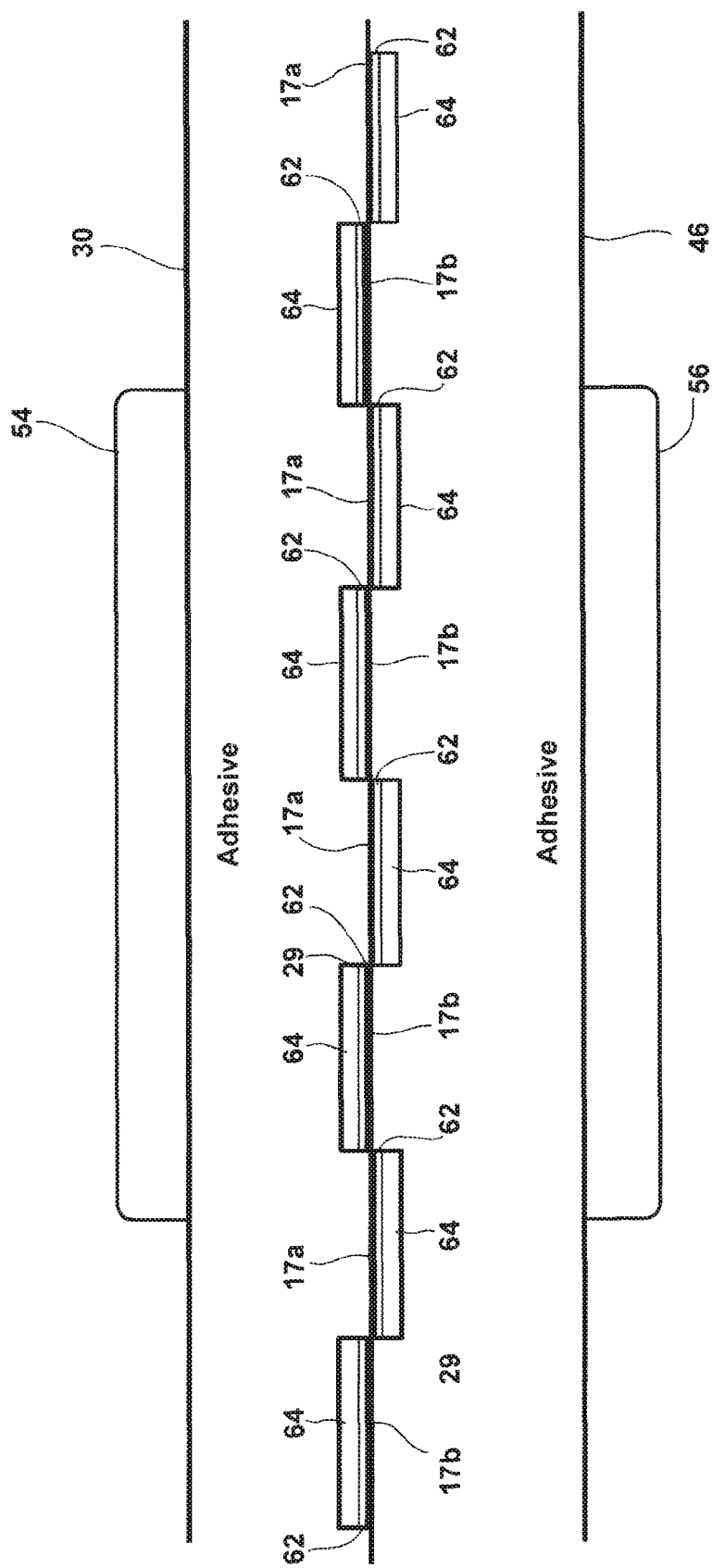
FIG. 14 is a detailed cross-section view of the package of FIG. 12.

The die-cutting performed in the step 180 may optionally include the formation of a plurality of "micro-slits" 29 through the cold foil strips 12b, preferably, one on each side of each of the protected areas 16, as shown in FIGS. 6 and 14. The micro-slits 29 provide another tamper-indicative feature, inasmuch as the tearing of the cold foil strips 12b along the micro-slits 29 will be evident if an attempt is made to open the package.

Figure 7:
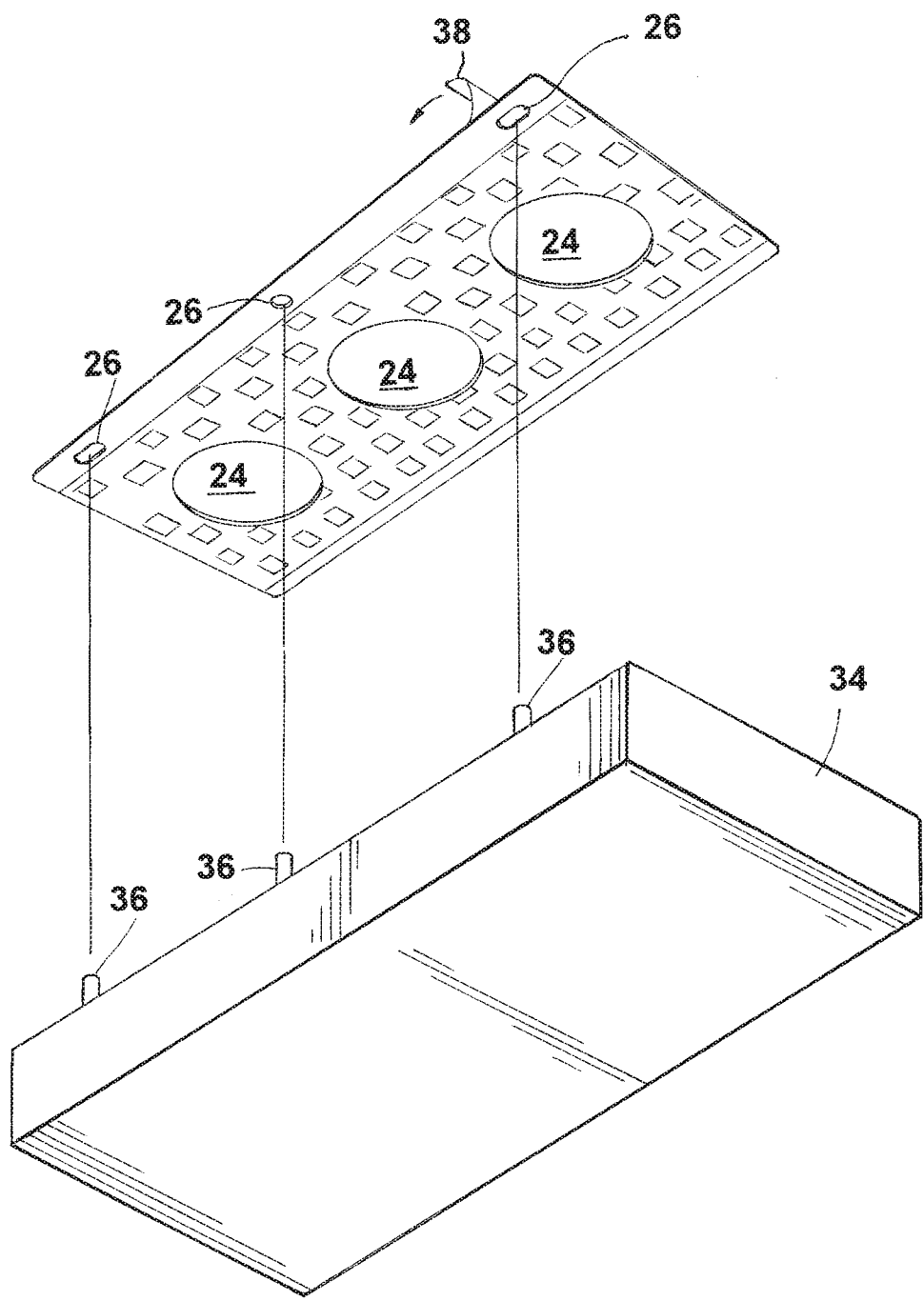
FIG. 7 is a perspective view of a strip cut from the die-cut web, showing the removal of a first clear adhesive liner from a first surface of the web strip.
Figure 8:
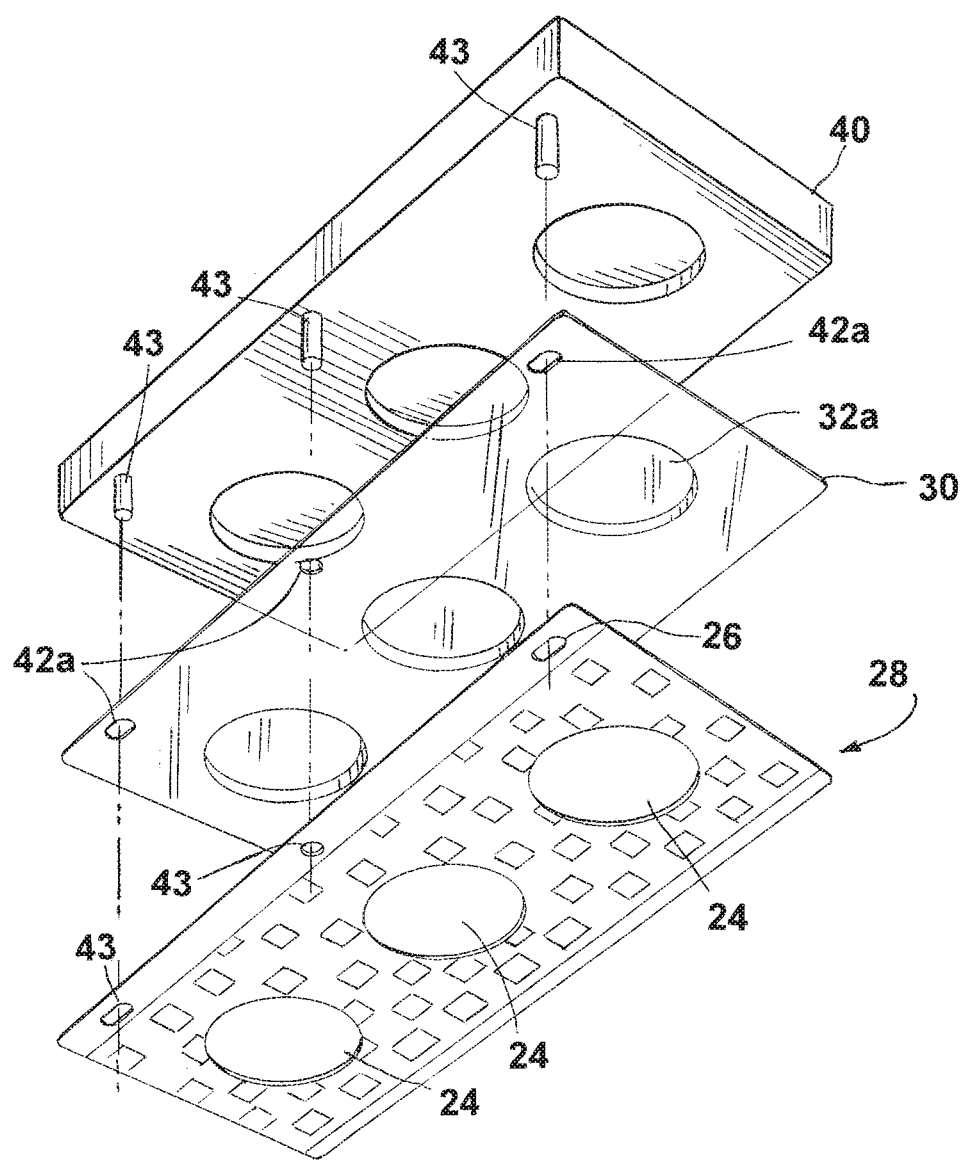
FIG. 8 is an exploded perspective view showing the attachment of the web strip of FIG. 7 to a first sheet of clear plastic blister material to form a strip of half-formed packages.

In step 210 (FIG. 1), a first semi-rigid (i.e., stiff, but flexible) outer layer 30 (FIG. 8) is attached to a first side of each of the strips 28. The first outer layer 30, preferably a semi-rigid sheet of PET, is pre-formed with a first plurality of blisters or cavities 32a, each of which is located and configured to fit into one of the holes 24. At least the portion of the first outer layer 30 forming the cavities 32a is transparent. The first outer layer 30 is attached by first releasably fixing the strip 28 to a first vacuum platen 34 having a plurality of pegs or pins 36 that register with and are received in the registration apertures 26, and then removing the clear plastic liner (designated by the numeral 38 in FIG. 7) from the exposed side of the strip 28, as shown in FIG. 7, leaving the pressure-sensitive adhesive exposed on that side of the strip 28. The first outer layer 30 is releasably fixed to a second vacuum platen 40, preferably means of a plurality of registration apertures 42a that register with and receive corresponding pegs or pins 43 on the second vacuum platen 40, as shown in FIG. 8. The first and second vacuum platens 34, 40 are then brought together under pressure to adhere the first outer layer 30 to the strip 28 by means of the exposed pressure-sensitive adhesive.

Figure 9:
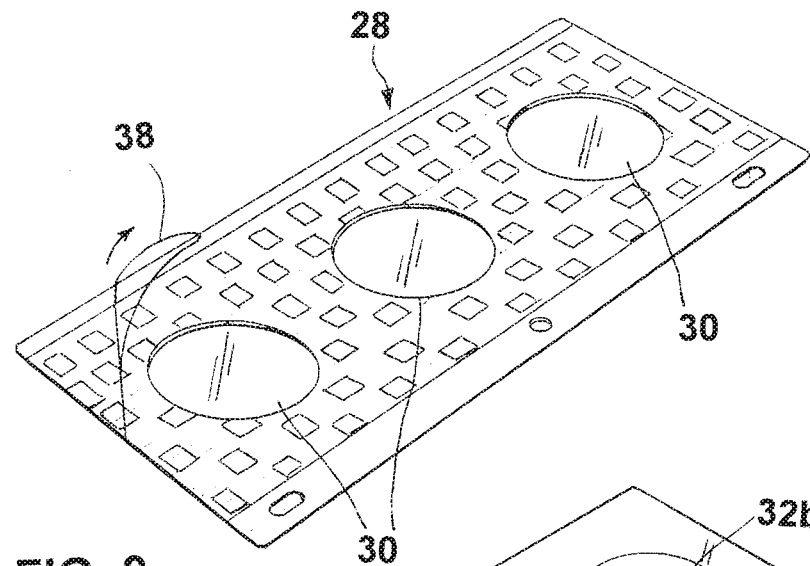
FIG. 9 is a perspective view of the web strip of FIG. 7, showing the removal of a second clear adhesive liner from a second surface of the web strip.
Figure 11:
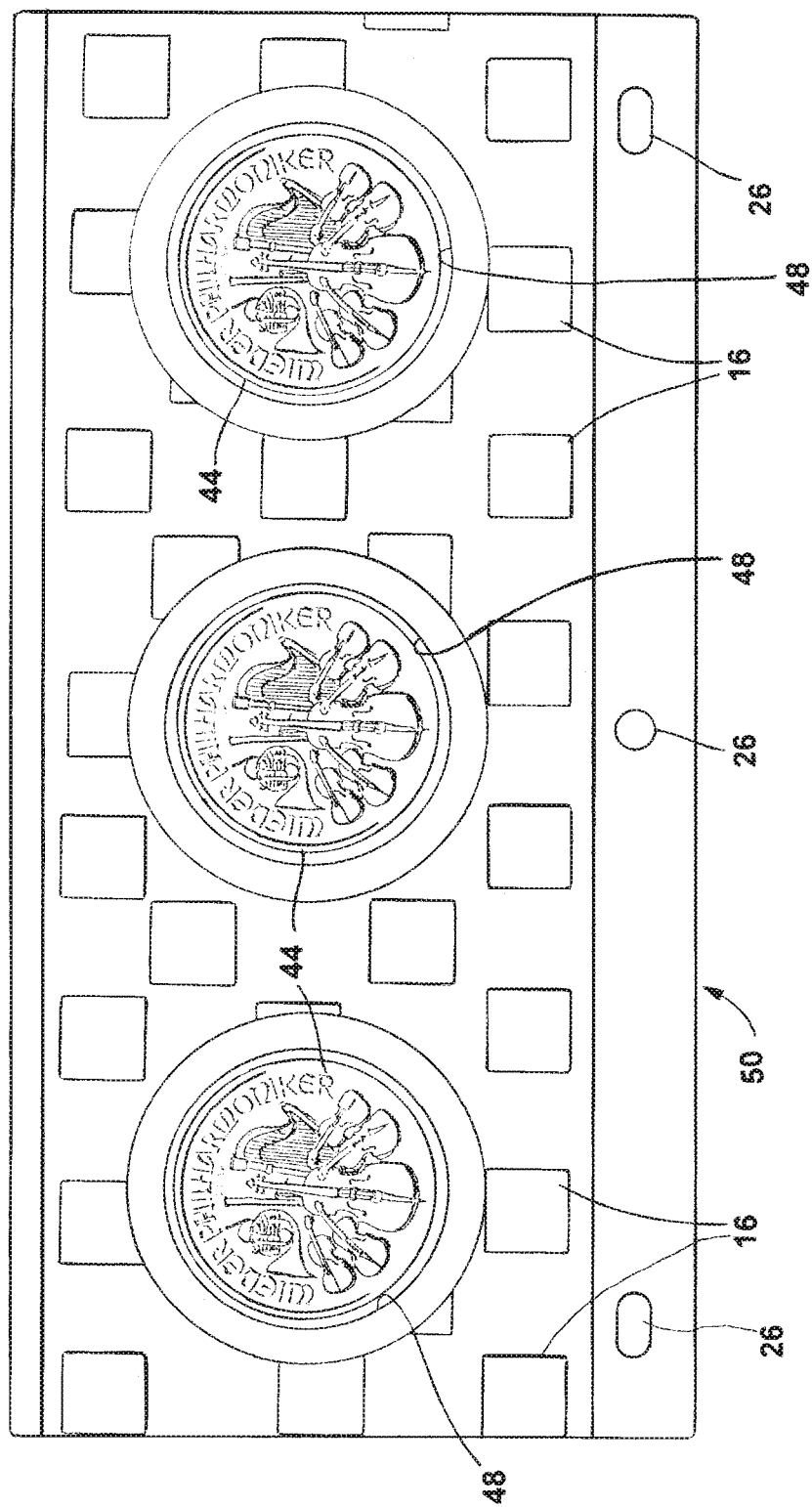
FIG. 11 is a plan view of a strip of three complete packages containing the packaged items before singulation.

In step 220 (FIG. 1), an item 44 to be packaged is placed into each of the cavities 32a in the first outer layer 30, and the items 44 are sealed into the cavities 32a by the attachment of a second semi-rigid outer layer 46 to the opposite side of the strip 28 from the first outer layer 30. The second outer layer 46, which may be of the same material as the first outer layer 30, may be pre-formed with a second plurality of transparent blisters or cavities 32b, each of which registers with one of the cavities 32a in the first outer layer 30 so as to form a sealed receptacle 48 (FIG. 11). Alternatively, the second outer layer 46 may be made without cavities or blisters, which may be advantageous if the second plurality of cold foil strips 12b has been formed without the blank spaces. With the strip 28 having the first outer layer 30 attached to it fixed to the second platen 40 after the above-described step 700, the clear plastic liner 38 is removed from the exposed second side of the strip 28, leaving the pressure-sensitive adhesive exposed on that side, as shown in FIG. 9.

Figure 10:
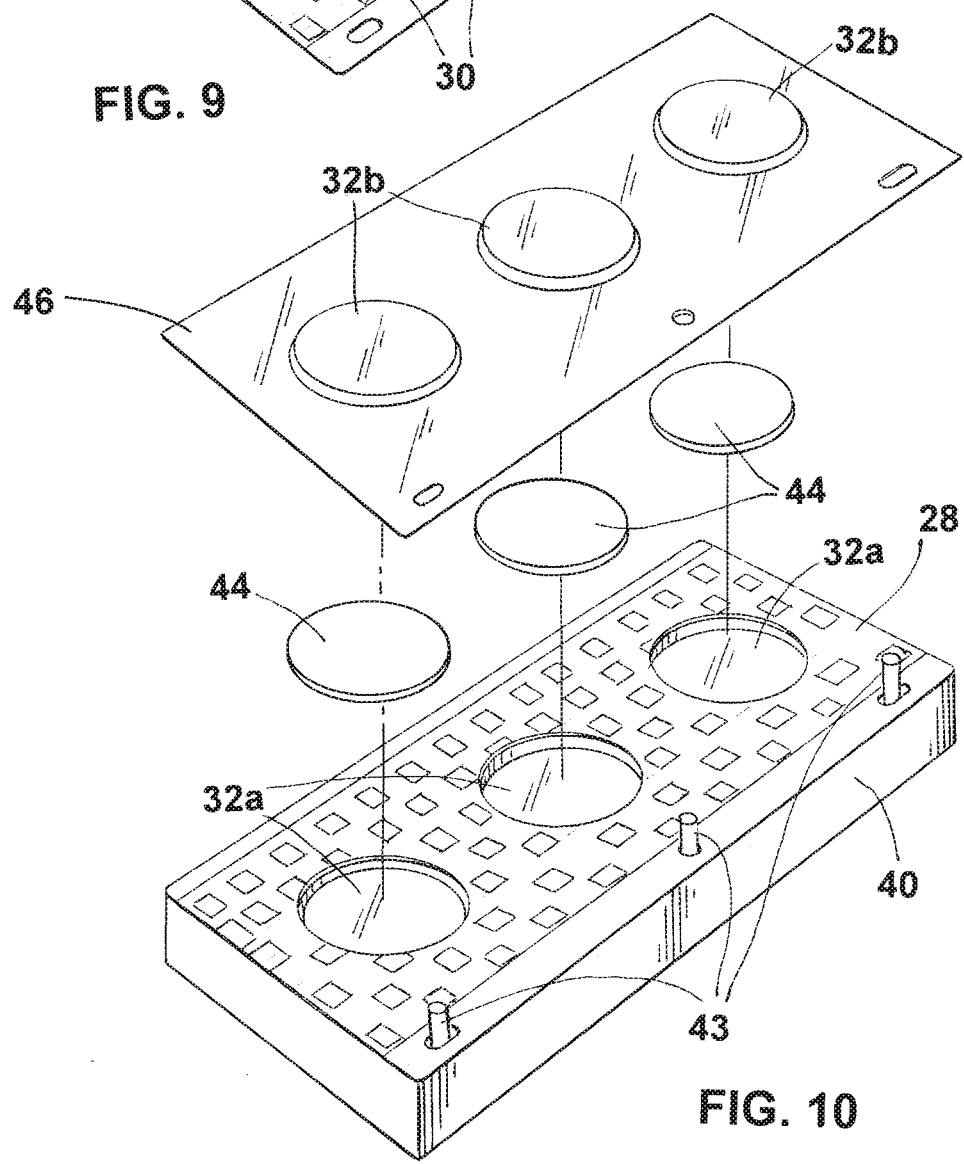
FIG. 10 is an exploded perspective view showing the insertion of items to be packaged into the half-formed packages of FIG. 8 and the attachment of a second sheet of clear plastic blister material to the second surface of the web strip to form a strip of complete packages with the packaged items contained therein.

Referring to FIG. 10, the items 44 are then placed in the cavities 32a of the first outer layer 30, and the second semi-rigid layer 46 is adhesively attached to the exposed adhesive. The attachment of the second outer layer 46 may be performed by releasably fixing it to a vacuum platen (not shown) using pegs or pins in the platen that are registered with and received in registration apertures 42b in the second outer layer 46, and then bringing the platen carrying the second outer layer 46 into engagement, under pressure, with the second platen 40 carrying the strip 28 and the first outer layer 30. As noted above, the attachment of the second outer layer 46 results in a sealed receptacle for each of the items 44 provided by the aligned cavities or blisters 32a, 32b of the first and second outer layers 30, 46, respectively. The transparent blisters or cavities 32a, 32b provide windows through which both sides of the item 44 can be viewed, Alternatively, if only the first outer layer 30 is provided with transparent cavities or blisters 32a, only one side of the item 44 may be viewed.

Assuming both outer layers 30, 46 include transparent cavities or blisters, the result is a multi-package strip 50 (FIG. 11), which is then singulated into separate packages (step 900, FIG. 1). The first and second outer layers 30, 46, besides providing the item receptacles 48, also provide a degree of rigidity or stiffness to the strip 50, and thus to the individual packages formed from it.

Figure 1A:
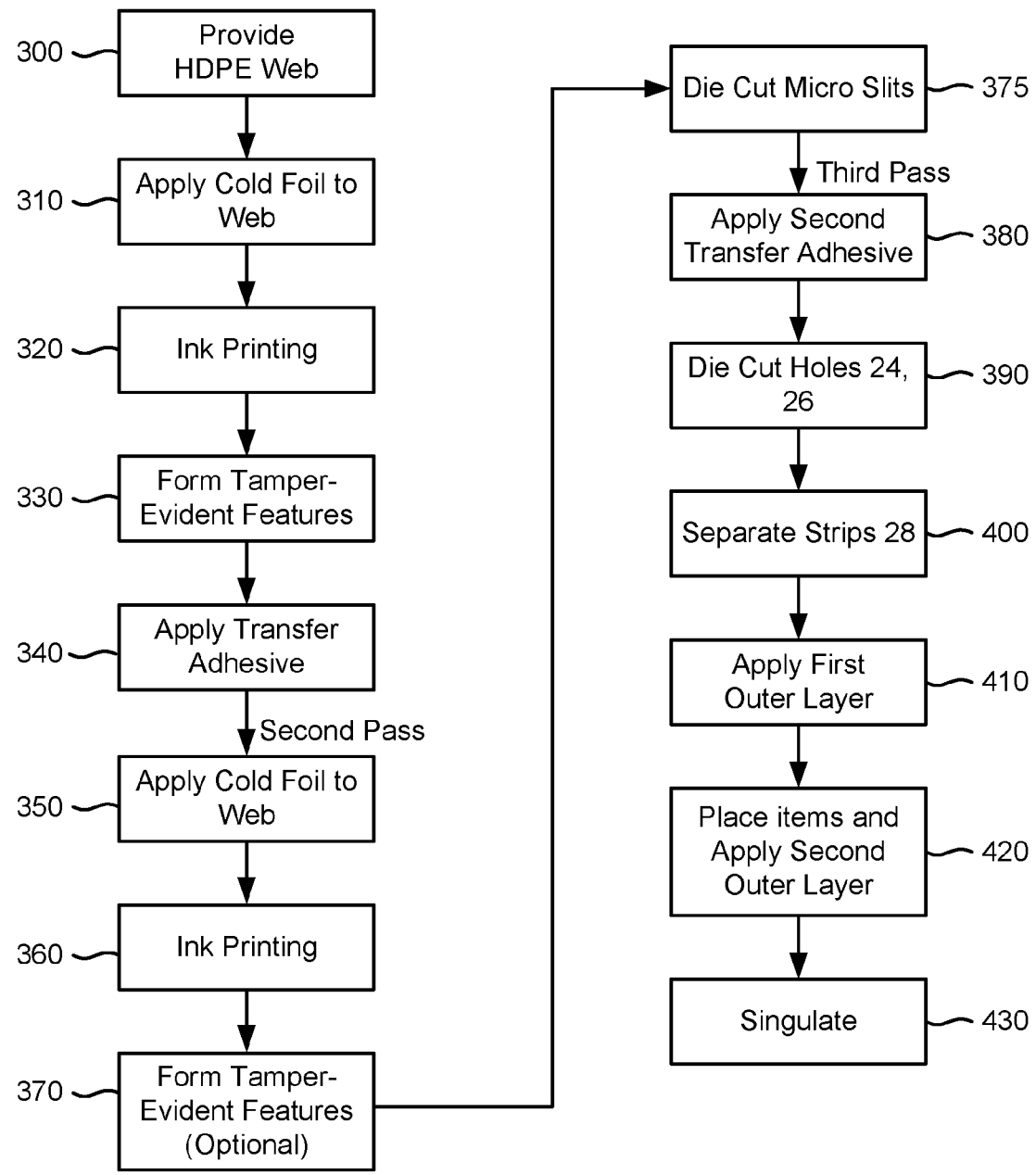
FIG. 1A is a flow chart of another exemplary method for manufacturing a tamper-evident package in accordance with embodiments of the present disclosure.
Figure 2:
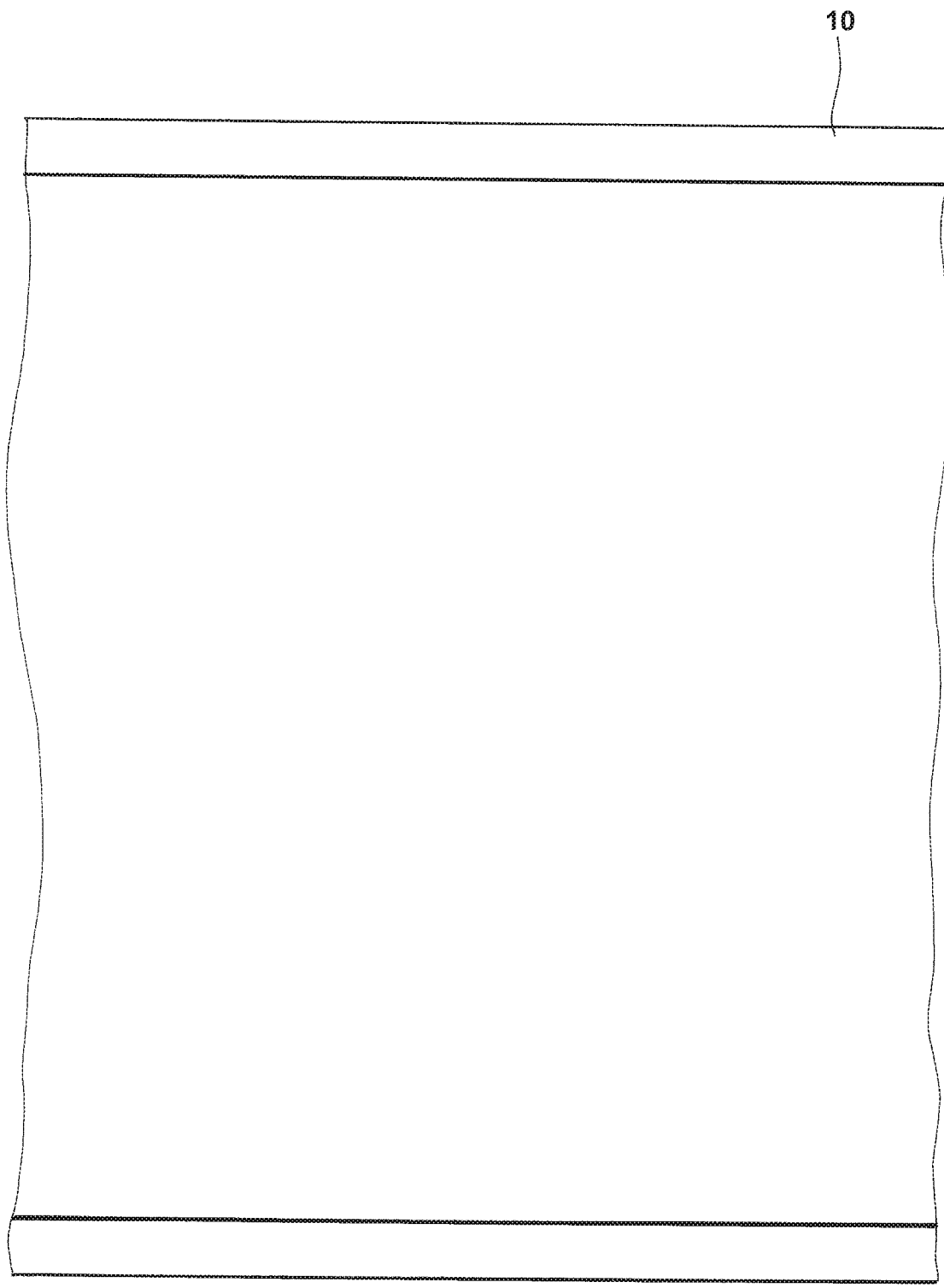
FIG. 2 is a plan view of a web of topcoated high-density polyethylene (HDPE) that is used to manufacture a tamper-evident package in accordance with embodiments of the present disclosure.
Figure 3:
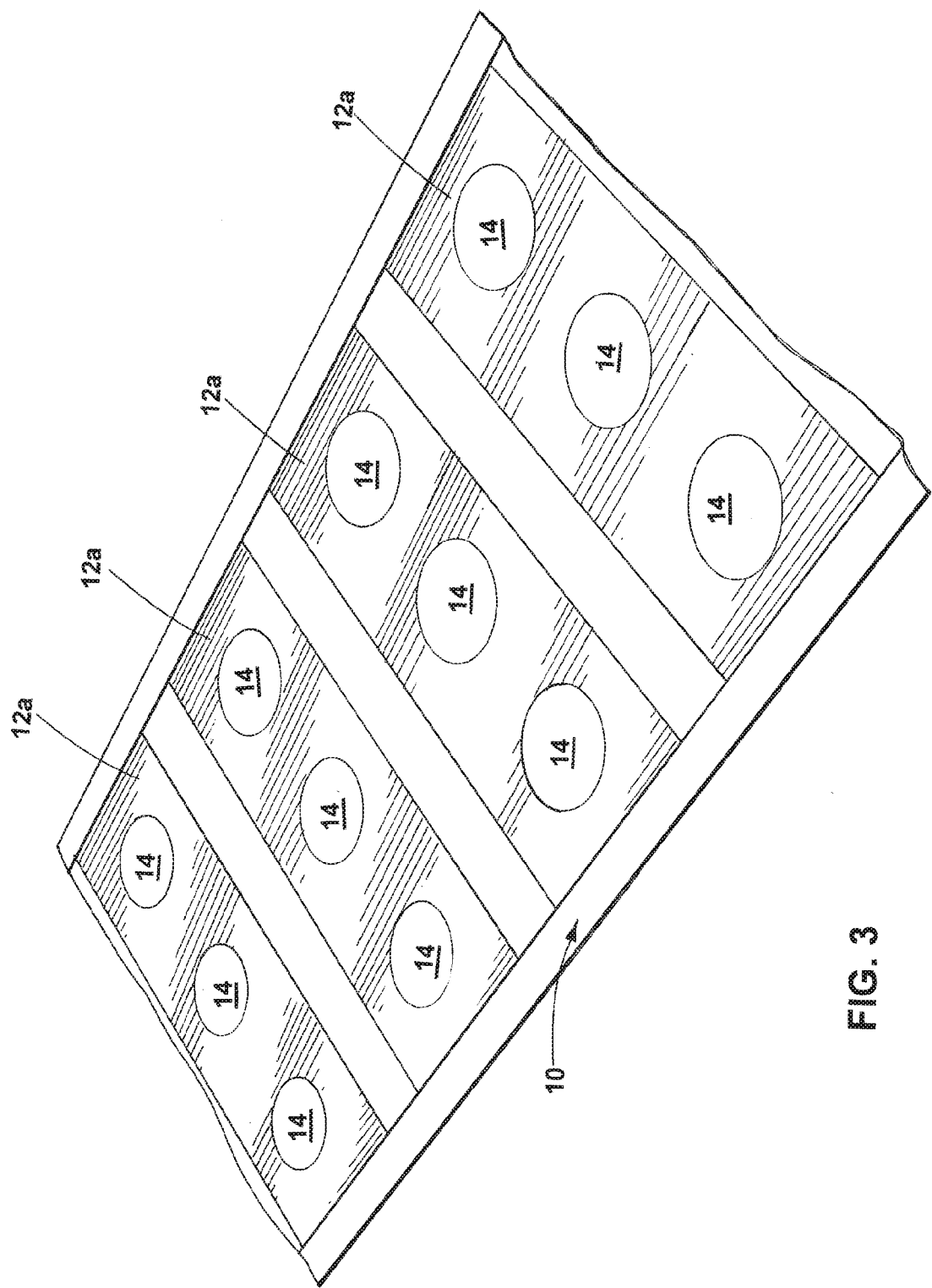
FIG. 3 is a perspective view of the web of topcoated HDPE shown in FIG. 2, after the application of cold foil material to a surface thereof.
Figure 4:
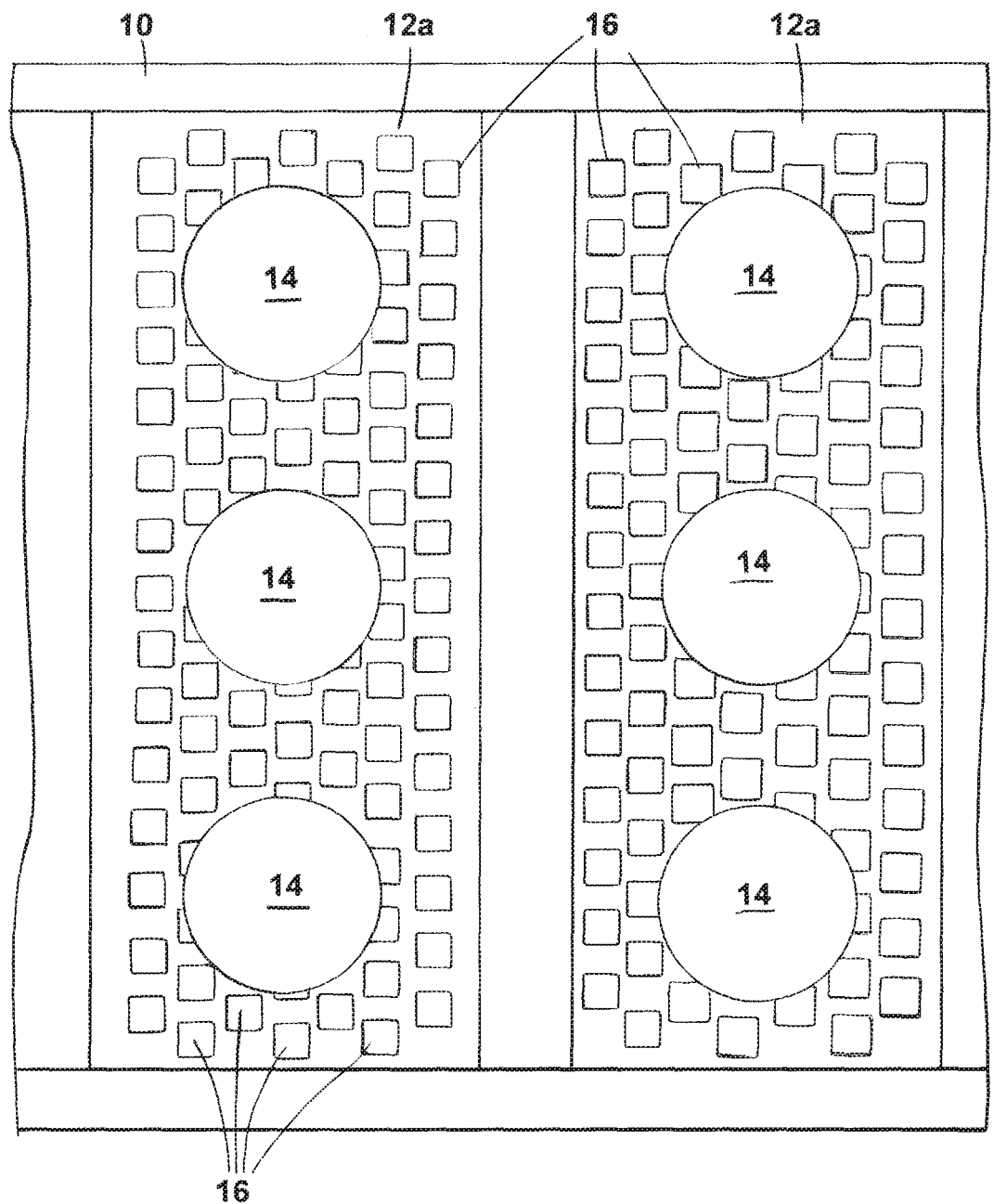
FIG. 4 is a plan view of the web after the formation of the tamper-evident feature on the cold foil material.
Figure 5:
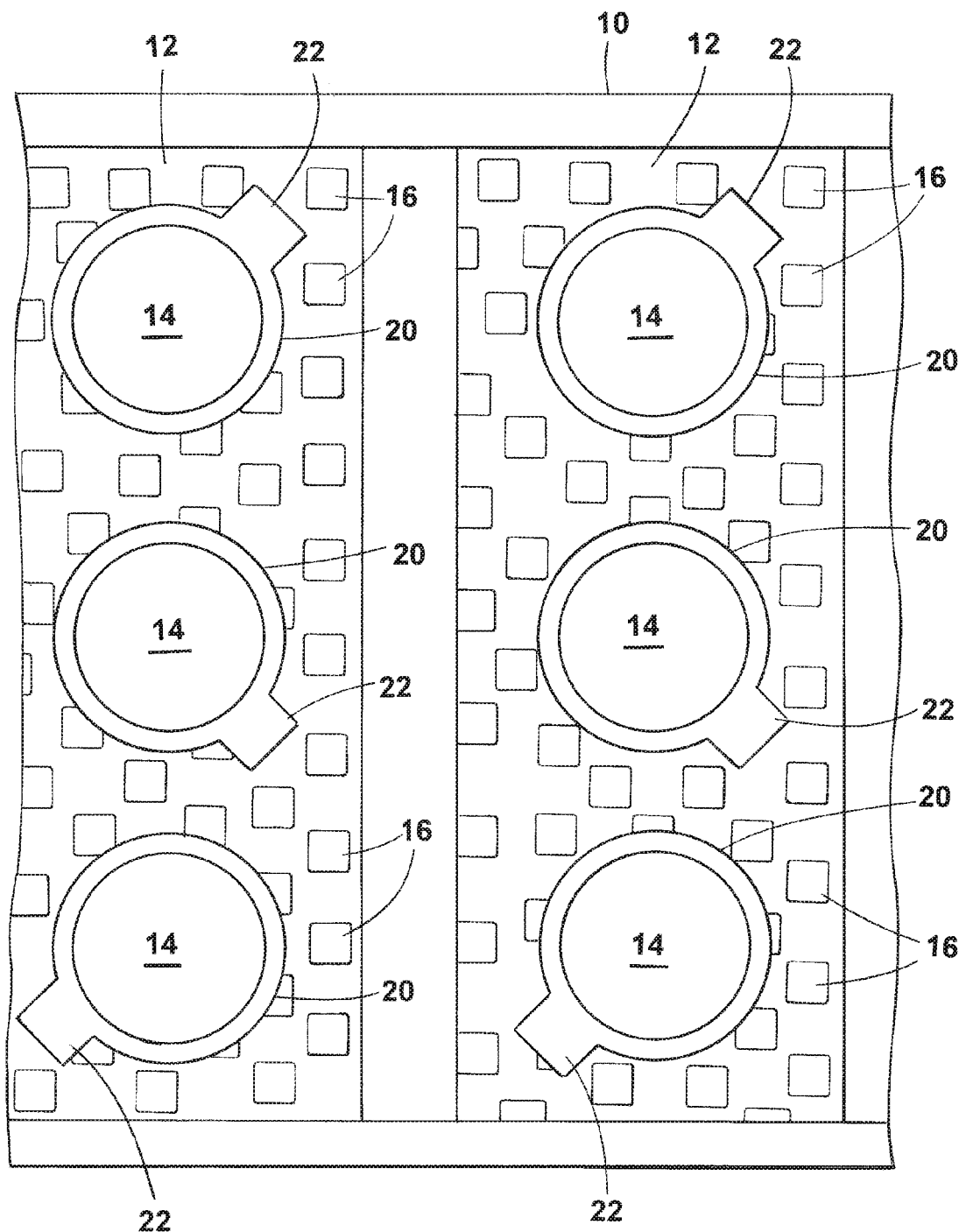
FIG. 5 is a plan view of the web of FIG. 4, after the application of cold foil material on the opposite surface of the web, and after die-cutting the web to form the item-holding windows and the indexing apertures.

Another exemplary manufacturing method is shown in FIG. 1A. This method commences with a first or initial pass through the fabrication process with steps 300, 310, 320, 330, and 340, corresponding to the steps 100-140, respectively, of FIG. 1. A second pass through the process includes steps 350, 360, and 370, corresponding to steps 150, 160, 170 of the method shown in FIG. 1, as described above (the step 370, like the above-described step 170, being optional). In an optional step 375, the micro-slits 29 may be formed by die-cutting.

The web 10 is now prepared for a third pass through the process. The third pass is initiated with step 380, in which a transfer adhesive is applied to the second plurality of cold foil strips 12b. This is followed by die-cutting the web to form the holes 24 and the registration apertures 26 (step 390), followed by cutting the web into the strips 28 (step 400). Next, the first semi-rigid outer layer 30 is applied (step 410), the items to be packaged are placed in the designated locations on each strip 28 (step 420), and the packages are singulated (step 430), as described above with respect to steps 210, 220, and 230, respectively, of FIG. 1.

Figure 12:
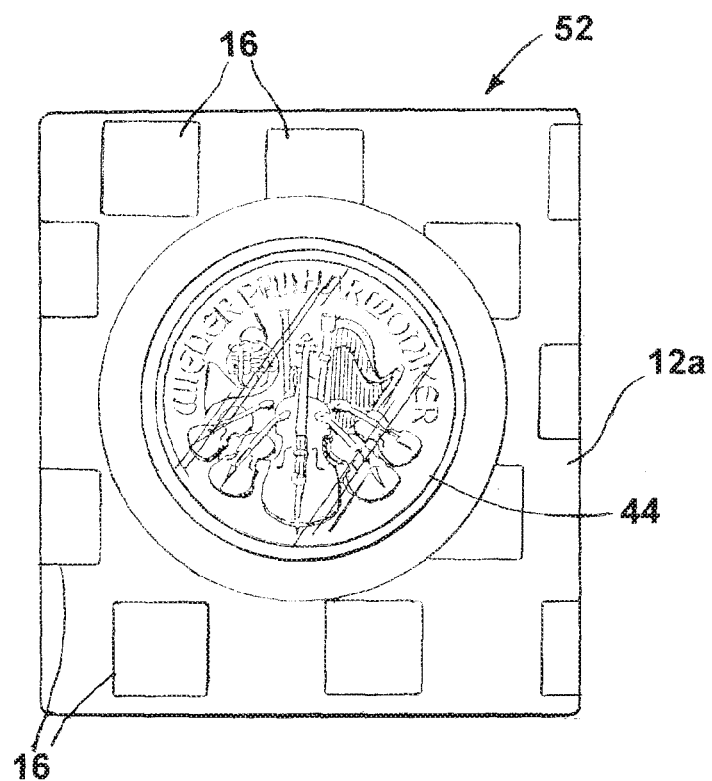
FIG. 12 is a plan view of an exemplary package in accordance with embodiments of this disclosure, after singulation of the package strip of FIG. 11.
Figure 13:
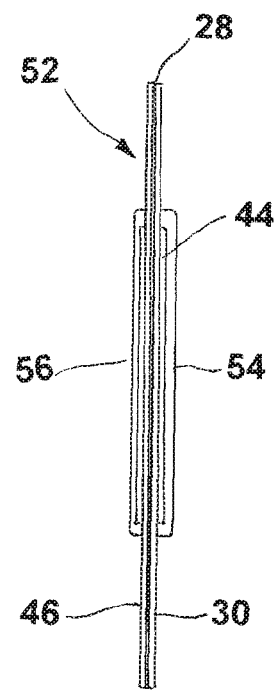
FIG. 13 is a side elevation view of the package of FIG. 12.

Referring now to FIGS. 12-14, a single package 52 with a packaged item 44 contained therein is shown. The package 52 includes first or front window 54 and a second or rear window 56, formed by the cavities 32a, 32b of the first and second outer layers 30, 46, respectively, through which the item 44 is visible. The body of the package 52 is formed from the web 10 with a first cold foil layer (formed from one of the first plurality of cold foil strips 12a) adhered to a first or front surface, and a second cold foil layer (formed from one of the second plurality of cold foil strips 12b) adhered to a second or rear surface, thereby forming a laminated substrate 58 (FIG. 14) having first and second opposed surfaces, at least the first of which incorporates the tamper-evident features formed by the process described above in connection with step 300. Thus, at least one of the surfaces of the laminated substrate 58 will have a pattern of protected areas 16 defining a complementary pattern of tamper-evident areas 17.

The laminated substrate 58 shown in FIG. 14 is an embodiment with tamper-evident features on both surfaces, although, as discussed above, in other embodiments, the substrate 58 may have the tamper-evident features on only one surface. It may be advantageous, in those embodiments having tamper-evident features on both surfaces of the laminated substrate 58, for the patterns of protected areas and tamper-evident areas on the first surface to be complementary with the corresponding patterns on the second surface. For example, as shown in FIG. 14, if a "checkerboard" pattern is used, the first surface will have square protected areas (each comprising a layer of release agent 62 and a layer of adhesive deadener 64) that alternate with adhesive-filled tamper-evident areas 17a (i.e., areas without the release agent and adhesive deadener), while the second surface will have square protected areas that coincide with the adhesive-filed tamper-evident areas 17a on the first surface, and adhesive-filled tamper-evident areas 17b that coincide with the protected areas on the first surface. Thus, the pattern of tamper-evident areas 17b on the second surface of the web 10 will be the mirror-image of the pattern of tamper-evident areas 17a on the first surface of the web 10, as shown in FIG. 14.

As best seen in FIG. 14, each of the protected areas includes a layer of release agent 62 printed in a pre-defined pattern on the first surface and (optionally) the second surface of the substrate 58, and a layer adhesive deadener 64 printed, in the same pattern, over the release agent, to form the patterns of the protected areas that define the complementary patterns of tamper-evident areas 17a (and, optionally, 17b). As mentioned above, in those embodiments having tamper-evident features on both surfaces of the substrate, it is advantageous to have a first pattern for the tamper-evident areas 17a on the first substrate surface and a second pattern for the tamper-evident areas 17b on the second substrate surface, with the patterns on the two surfaces being complementary to each other (i.e., mirror images), as mentioned above. The outer layers 30, 46 are adhesively applied to the substrate 58 over the printed patterns of release agent 62 and adhesive deadener 64, as described above, and the complete laminated structure is die-cut and singulated, as described above, to complete the individual packages 52.

Figure 15:
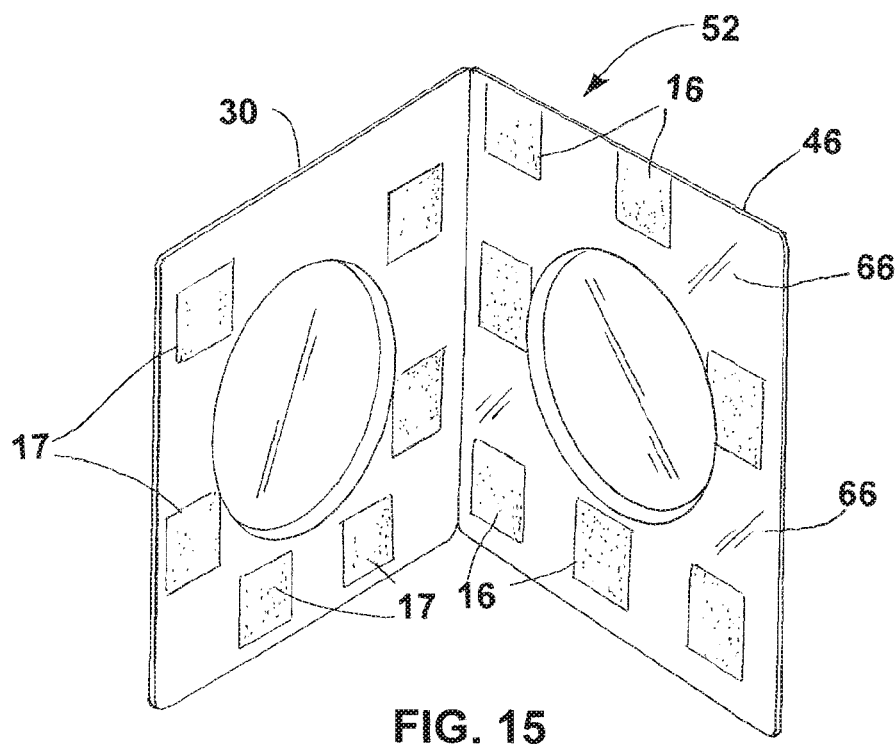
FIG. 15 is a perspective view of the package of FIG. 12 after it has been opened, illustrating a tamper-evident feature of the package in accordance with embodiments of this disclosure.

Referring to FIGS. 14 and 15, the tamper-evident feature works as follows: If an attempt is made to open the package 52 by removing one of the outer layers 30, 46 (e.g., the first outer layer 30 in FIG. 15), the tamper-evident areas 17 that are in contact with the outer layer via the release agent and the adhesive deadener 64 will remain intact on the underlying web 10, due to the reduced adhesion between the outer layer material and the cold foil material effected by the adhesive deadener 64. Thus, the outer layers 30, 46 adhere to the cold foil strips 12a, 12b, respectively, only at the adhesive-filled tamper-evident areas 17a, 17b, respectively, and not at the protected areas. The adhesive-filled tamper-evident areas 17a, 17b on the substrate 58, being filled with the transfer adhesive after step 400 is performed (as described above), adhere to the outer layer being removed, leaving a tell-tale "transfer patch" of exposed web material where the cold foil has been removed, as indicated, for example, by the areas 66 in FIG. 15. Because of the irregular shapes of the transfer patches 66, and the presence of irregular sub-areas of foil residue in each patch 66, any attempt to re-attach the outer layer in a way that does not reveal a prior removal is likely to be unsuccessful. It will be understood that, in those embodiments having tamper-evident features on only the first web or substrate surface, the tell-tale "transfer patch" of exposed web material will be left only after removal of the first outer layer 30, and not after removal of the second outer layer 46.

Although exemplary embodiments of a tamper-evident package and a method of manufacturing it in accordance with the present disclosure are described above and in the drawings, it will be appreciated that other embodiments may suggest themselves to those of ordinary skill in the pertinent arts. Variations and modifications of the disclosed embodiments may likewise suggest themselves. For example, it will be appreciated that the specific order of the method steps described herein is exemplary, and that such steps, or their equivalents, may be performed in other sequences that may be suitable for particular purposes and for specific variations in the construction of the package. Similarly, the patterns for the "protected areas" and the tamper-evident areas on the tamper-evident layers, as shown in the drawings and as described above, are exemplary only; other patterns may readily suggest themselves, depending on various aesthetic and practical considerations. Also, materials other than those specified above may be found suitable for different particular applications. Moreover, if tamper-evident features are provided only on one surface of the web, the second outer layer may be attached to the other surface by means other than an adhesive, such as, for example, by heat-welding or sonic welding. Such variations, modifications, and alternative embodiments are considered to be within the scope of the present disclosure.

What is claimed is:

1. A method of packaging an item, comprising the steps of:
   (a) forming a tamper-evident layer on a first surface of a web of sheet material having first and second surfaces, the tamper evident layer comprising a pattern of tamper-evident areas, the tamper-evident layer including a blank space;
   (b) adhesively attaching a first semi-rigid outer layer having a portion defining a cavity to the tamper-evident layer so as to adhere only to the tamper-evident areas, whereby the cavity is aligned with the blank space;
   (c) placing an item in the cavity defined in the first semi-rigid outer layer; and
   (d) attaching a second semi-rigid outer layer to the second surface of web;
   wherein the step of adhesively attaching the first semi-rigid outer layer to the tamper-evident areas is performed so that only the tamper-evident areas are removed from the web with the removal of the first semi-rigid outer layer from the tamper-evident layer.

2. The method of claim 1, wherein the step of forming the tamper-evident layer comprises:
   (a)(1) applying a plurality of cold foil strips to the first surface of the web of sheet material; and
   (a)(2) forming the pattern of tamper-evident areas on each of the plurality of cold foil strips.

3. The method of claim 1, wherein the pattern of tamper-evident areas is defined by a pattern of protected areas that do not adhere to the first semi-rigid outer layer.

4. The method of claim 3, wherein each of the protected areas is formed by printing a release agent on the tamper-evident layer in a predetermined pattern, and then printing an adhesive deadener on top of the release agent printed on the tamper-evident layer.

5. The method of claim 4, wherein the release agent is printed on the tamper-evident layer in a first predetermined pattern.

6. The method of claim 1, wherein, after the step of forming the tamper-evident layer, a hole is made in the blank space of the web; wherein the cavity of the first semi-rigid outer layer comprises a transparent cavity portion; wherein the second semi-rigid outer later includes a transparent cavity portion; and wherein the steps of attaching the first and second semi-rigid outer layers includes aligning the first and second transparent cavity portions with the hole in the web.

7. The method of claim 1, wherein the step of forming the tamper-evident layer includes the step of providing a security taggant in the tamper-evident layer.

8. The method of claim 1, wherein the tamper-evident layer is a first tamper-evident layer comprising a first pattern of tamper-evident areas, the method further comprising forming a second tamper-evident layer on the second surface of the web, the second tamper-evident layer comprising a second pattern of tamper-evident areas;
   wherein the step of attaching the second semi-rigid outer layer to the second surface of the web is performed by adhesively attaching the second semi-rigid outer layer to the second tamper-evident layer so as to adhere only to the tamper-evident areas in the second pattern of tamper-evident areas; and
   wherein the steps of attaching the first and second semi-rigid outer layers to the tamper-evident areas in the first and second patterns of tamper-evident areas, respectively, are performed so that only the tamper-evident areas in the first and second patterns of tamper-evident areas are removed from the web with the removal of the first and second semi-rigid outer layers from the first and second tamper-evident layers, respectively.

9. A tamper-evident package, comprising:
   a laminate comprising a flexible web having first and second opposed surfaces, a tamper-evident layer on the first surface, the tamper-evident layer defining a blank space on the first surface of the web, the tamper-evident layer including a first pattern of protected areas and a second pattern of tamper-evident areas;
   a first semi-rigid outer layer adhesively attached to the tamper-evident layer so as to adhere only to the tamper-evident areas on the tamper-evident layer, the first semi-rigid outer layer including a transparent portion aligned with the blank space; and
   a second semi-rigid outer layer attached to the second surface of the web.

10. The tamper-evident package of claim 9, wherein the tamper-evident layer comprises a cold foil strip.

11. The tamper-evident package of claim 9, wherein each of the protected areas comprises:
   a layer of release agent applied in a first pattern on the tamper-evident layer; and
   a layer of adhesive deadener applied over the layer of release agent.

12. The tamper-evident package of claim 9, wherein the laminate includes a hole coinciding with the blank space, and wherein the second semi-rigid outer layer includes a transparent portion aligned with the hole.

13. The tamper-evident package of claim 9, further comprising a packaged item disposed on the blank space of the web so as to be visible through the transparent portion of the first semi-rigid outer layer.

14. The tamper-evident package of claim 12, further comprising a packaged item disposed in the hole so as to be visible through the transparent portion of the first and second semi-rigid outer layers.

15. The tamper-evident package of claim 9, further comprising a security taggant in the tamper-evident layer.

16. The tamper-evident package of claim 9, wherein the laminate comprises a first tamper-evident layer on the first surface of the web and a second tamper-evident layer on the second surface of the web, each of the first and second tamper-evident layers including a first pattern of protected areas and a second pattern of tamper-evident areas;
- wherein the first semi-rigid outer layer is adhesively attached to the first tamper-evident layer so as to adhere only to the tamper-evident areas of the first tamper-evident layer; and
- wherein the second semi-rigid outer layer is adhesively attached to the second tamper-evident layer so as to adhere only to the tamper-evident areas of the second tamper-evident layer.

17. A packaged item, comprising:
- a flexible web having first and second opposed surfaces;
- a tamper-evident layer on the first surface of the web, the tamper evident layer having a first pattern of tamper-evident areas and a second pattern of protected areas, the first and second patterns defining a blank space on the first surface of the web;
- a first semi-rigid outer layer adhesively attached to the first tamper-evident layer so as to adhere only to the tamper-evident areas on the tamper-evident layer, the first semi-rigid outer layer including a transparent portion aligned with the blank space;
- an item disposed on the blank space of the web so as to be visible through the transparent portion of the first semi-rigid outer layer; and
- a second semi-rigid outer layer attached to the second surface of the web.

18. The packaged item of claim 17, wherein the tamper-evident layer comprises a cold foil strip.

19. The packaged item of claim 17, wherein each of the protected areas comprises:
- a layer of release agent applied in a first pattern on the first tamper-evident layer; and
- a first layer of adhesive deadener applied over the first layer of release agent.

20. The packaged item of claim 17, wherein the web includes a hole coinciding with the blank space, and wherein the second semi-rigid outer layer includes a transparent portion aligned with the hole.

21. The packaged item of claim 20, wherein the packaged item is disposed in the hole so as to be visible through the transparent portion of the first and second semi-rigid outer layers.

22. The packaged item of claim 17, further comprising a security taggant in the tamper-evident layer.

23. The packaged item of claim 17, wherein the tamper-evident layer on the first surface of the web is a first tamper evident layer, the packaged item further comprising a second tamper-evident layer on the second surface of the web, the second tamper evident layer having a first pattern of tamper-evident areas and a second pattern of protected areas;
- wherein the second semi-rigid outer layer is adhesively attached to the second tamper-evident layer so as to adhere only to the tamper-evident areas on the second tamper-evident layer.

* * * * *